US012812522B2

(12) United States Patent
Foti

(10) Patent No.: US 12,812,522 B2
(45) Date of Patent: Nov. 24, 2026

(54) GENERIC FRAMEWORK FOR SUPPORT OF MULTIPLE PROFILES SUPPORT IN 5G

(71) Applicant: Telefonaktiebolaget LM Ericsson (publ), Stockholm (SE)

(72) Inventor: George Foti, Dollard des Ormeaux (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 441 days.

(21) Appl. No.: 18/559,977

(22) PCT Filed: May 9, 2022

(86) PCT No.: PCT/IB2022/054296
§ 371 (c)(1),
(2) Date: Nov. 9, 2023

(87) PCT Pub. No.: WO2022/238870
PCT Pub. Date: Nov. 17, 2022

(65) Prior Publication Data

US 2024/0251340 A1 Jul. 25, 2024

Related U.S. Application Data

(60) Provisional application No. 63/187,596, filed on May 12, 2021.

(51) Int. Cl.
*H04W 48/18* (2009.01)
*H04W 60/00* (2009.01)
(Continued)

(52) U.S. Cl.
CPC ......... *H04W 48/18* (2013.01); *H04W 60/002* (2025.08); *H04W 60/02* (2013.01); *H04W 60/04* (2013.01)

(58) Field of Classification Search
CPC ... H04W 48/18; H04W 60/00; H04W 60/002; H04W 60/02; H04W 60/04; H04W 8/18
See application file for complete search history.

(56) References Cited

U.S. PATENT DOCUMENTS

2022/0338000 A1* 10/2022 Lee ........................ H04W 12/71
2023/0079012 A1* 3/2023 Ying ...................... H04W 76/27
(Continued)

OTHER PUBLICATIONS

International Search Report and Written Opinion dated Aug. 2, 2022 issued in PCT Application No. PCT/IB2022/054296, filed May 9, 2022, consisting of 13 pages.
(Continued)

*Primary Examiner* — Awet Haile
(74) *Attorney, Agent, or Firm* — Weisberg I.P. Law, P.A.

(57) ABSTRACT

A method, system and apparatus are disclosed. According to one or more embodiments, a method implemented in a wireless device configured to communicate with an Access and Mobility Management Function, AMF, node and a Unified Data Management, UDM, node is provided. The method includes determining to initiate a switch from a first profile associated with a first profile identifier, PID, to a target profile associated with a target PID. The method further includes causing transmission of a switch request message indicating the switch, the switch request message being configured to initiate the UDM node to activate the target profile. The method further includes causing transmission of or receiving signaling in accordance with the activated target profile associated with the target PID.

18 Claims, 12 Drawing Sheets

(51) Int. Cl.
*H04W 60/02* (2009.01)
*H04W 60/04* (2009.01)

(56) References Cited

U.S. PATENT DOCUMENTS

| | | | | |
|---|---|---|---|---|
| 2023/0189187 | A1* | 6/2023 | Velev | H04W 48/16 455/435.1 |
| 2023/0337122 | A1* | 10/2023 | Tamura | H04W 60/04 |
| 2023/0345333 | A1* | 10/2023 | Kim | H04W 36/142 |
| 2023/0413212 | A1* | 12/2023 | De Foy | H04W 4/70 |
| 2024/0187968 | A1* | 6/2024 | Tiwari | H04W 8/04 |

OTHER PUBLICATIONS

SA WG2 Temporary Document; S2-2009436; 3GPP TSG-WG SA2 Meeting #1412 e-meeting; Source: Qualcomm, NEC, Apple, Nokia, Nokia Shanghai Bell; Title: KI#6 Evaluation and Conclusions; Document for: Agreement; Agenda Item 8.4; Work Item / Release: FS_eNS_Ph2 / Rel 17; Elbonia, Nov. 16-20, 2020, Electronic Meeting, consisting of 3 pages.

SA WG2 Temporary Document; S2-2009437 (revision of S2-2008390); 3GPP TSG-WG SA2 Meeting #142E e-meeting; Source: Ericsson; Title: KI#6: Update to Solution 40; Document for: Approval; Agenda Item: 8.4; Work Item / Release: FS_eNS_Ph2 / Rel 17; Elbonia, Nov. 16-20, 2020, consisting of 7 pages.

3GPP TS 23.502 V17.0.0; 3rd Generation Partnership Project; Technical Specification Group Services and System Aspects; Procedures for the 5G System (5GS); Stage 2 (Release 17), Mar. 2021, consisting of 646 pages.

* cited by examiner

GENERIC FRAMEWORK FOR SUPPORT OF MULTIPLE PROFILES SUPPORT IN 5G

CROSS-REFERENCE TO RELATED APPLICATIONS

This application is a Submission Under 35 U.S.C. § 371 for U.S. National Stage Patent Application of International Application No.: PCT/IB2022/054296, filed May 9, 2022 entitled "GENERIC FRAMEWORK FOR SUPPORT OF MULTIPLE PROFILES SUPPORT IN 5G," which claims priority to U.S. Provisional Application No. 63/187,596, filed May 12, 2021, entitled "GENERIC FRAMEWORK FOR SUPPORT OF MULTIPLE PROFILES SUPPORT IN 5G," the entireties of both of which are incorporated herein by reference.

FIELD

The present disclosure relates to wireless communications, and in particular, to wireless device initiated profile switching such as based on a profiled ID (PID) concept.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs.

In 3GPP, it has been described to isolate the usage of network slices by a wireless device where the wireless device is allocated different identities to use with sets of single-network slice selection assistance information, S-NSSAIs, S-NSSAIs, that may require isolation. For example, the wireless device may be allocated subscription permanent identifer1 (SUPI1)/generic public subscription identifier1 (GPSI1) for S-NSSAI1 and SUPI2/GPSI2 for S-NSSAI2 if S-NSSAI1 and S-NSSAI2 require isolation. The wireless device may have to register with the identity corresponding to the S-NSSAI that the wireless device wants to use. This helps ensure that the wireless device can never use the S-NSSAIs requiring isolation simultaneously.

To support the above, the wireless device is provisioned with a User Profile associated with a single subscription, but is also allocated an independent alias SUPI/GPSI (s) for every set of S-NSSAIs that has be used independently. These additional alias SUPI(s), GPSIs and the compatible S-NSSAI(s) they are bound to can also be used to authenticate the wireless device if the S-NSSAI(s) require secondary authentication. Alias SUPIs have no subscription associated with them and are used for the purpose of slice switching between isolated sets using the registration procedure. Alias SUPIs are received at initial registration of the wireless device, in a registration accept response, and are considered configuration information by the wireless device. Further, in this multiple profiles concept a Unified Data Management (UDM) node is allowed to download multiple SUPIs where only one SUPI is associated with the subscription while, while the other SUPIs are considered as secondary SUPIs, or Alias SUPIs Hence, there are constraints on simultaneous use of the network slice, e.g., the wireless device cannot use one set of slices simultaneous with another set of slices due to the "isolation" requirement.

SUMMARY

Some embodiments advantageously provide methods, systems, and apparatuses for profile switching at a wireless device such as based on a profile identifier (PID) concept.

The present disclosure is an extension of the multiple profiles concept which allows a UDM to download multiple SUPIs where only one SUPI is associated with the subscription. The other SUPIs may be considered secondary SUPIs, or Alias SUPIs. One or more embodiments described herein allows for a UE to use S-NSSAIs that cannot be used simultaneously according to, for example, the "isolation" requirement.

In one or more embodiments, a wireless device is allocated multiple profiles. Each profile may be identified with a PID.

Each PID is allocated any number of network slices for use, the network slices can be different, and some can be similar. Each network slice can be associated with different data networks, and other conditions in the profile.

Even if the same slice is used in different profiles, there can be different restrictions, and conditions as to what data network it can be used for per profile. UDM holds the relationships between PIDs, slices, and other relevant information to ensure that the proper profile is enforced.

The charging output includes the PID to ensure that profiles can be charged separately. The same applies for statistical information collected by the network.

Possible advantages for enabling multiple profiles for a subscriber are numerous. As an example, a subscriber may use his/her phone for work and for personal reasons were using configuring multiple profiles, as described herein, allows the subscriber to use separate profiles for different purposes, with separated charges per profile. More specifically, a subscriber may use the same phone, i.e., wireless device, but enable the following at different times: work related profile, personal related profile, profile for streaming, etc. The reasons for these different profiles can be due to any one of network slices with different purpose, cost related, network performance related, etc.

A phone or wireless device can also be shared by different users where the wireless device can also support multiple passwords for different users sharing the same devices so that the password can be a trigger for a profile switch.

In one or more embodiments, the UDM holds the information about the PIDs, and the corresponding profiles. The UDM enables an end user to switch between profiles through the use of the uplink (UL) NAS transport message and is now extended to enable the inclusion of a new information in the information element (IE) payload container, intended to the UDM, to enable the UDM to switch to a target profile. There may always be a default profile that will be the one used at initial wireless device registration.

Further, in one or more embodiments, at initial wireless device registration, the Access and Mobility Management Function (AMF) receives all PIDs from the UDM, as well as the subscribed S-NSSAIs bound to each PID. This enables the AMF to locate the Allowed S-NSSAI for each PID through interaction with Network Slice Selection Function, NSSF, and store them bound together.

The AMF returns to the wireless device at successful registration the Allowed S-NSSAIs for the current PID which is the default PID at initial wireless device registration. Additionally, the AMF returns to the wireless device all PIDs supported and the S-NSSAIs for each one.

The wireless device stores the PIDs bound to the subscribed S-NSSAIs. The Allowed S-NSSAIs for the PID associated with the default PID is also returned, and saved for the current PID.

For switching PIDs, the wireless device may determine to switch based at least on the selection of an application that requires an S-NSSAI bound to a different PID.

The wireless device proceeds to switch the target PID, through the use of an UL NAS transport message extended to request the UDM to switch to a new target PID.

The UDM notifies the AMF about a PID change. AMF may request the wireless device to re-register. AMF updates the Allowed S-NSSAI to match the target PID. The wireless device may be requested to perform mobility Registration if any S-NSSAI associated with the new PID requires secondary authentication.

Further, the wireless device may be configured with credentials required for secondary authentication for any S-NSSAI belonging to any PID. This will be enforced at Registration, or mobility registration associated with a new target PID.

Hence, one or more embodiments described herein advantageously enables one or more features with a low complexity solution. These one or more features extend wireless device capability using a low complexity framework.

According to one aspect of the present disclosure, a wireless device configured to communicate with an AMF node and a UDM node is provided. The wireless device includes processing circuitry configured to determine to initiate a switch from a first profile associated with a first profile identifier, PID, to a target profile associated with a target PID. The processing circuitry is further configured to cause transmission of a switch request message indicating the switch, the switch request message being configured to initiate the UDM node to activate the target profile. The processing circuitry is further configured to at least one of cause transmission of and receive signaling in accordance with the activated target profile associated with the target PID.

According to one or more embodiments of this aspect, the processing circuitry is further configured to receive a mobility registration message, and to perform mobility registration based on the mobility registration message, where the mobility registration is configured to re-register with the AMF node before using the target profile.

According to one or more embodiments of this aspect, the processing circuitry is further configured to store a mapping of users of wireless devices to PIDs, and to receive a login credential associated with a user of the wireless device, the determining the switch from the first profile to the target profile being based on the user being mapped to the target PID.

According to one or more embodiments of this aspect, the processing circuitry is further configured to cause transmission of a registration request message to the AMF node. The processing circuitry is further configured to, in response to the transmission of the registration request message, receive a registration accept message. The processing circuitry is further configured to determine, based on the registration accept message, the first PID and an allowed first single-network slice selection assistance information, S-NSSAI, associated with the first PID. The processing circuitry is further configured to at least one of cause transmission of and receive signaling in accordance with the allowed S-NSSAI.

According to one or more embodiments of this aspect, the determining of the first PID is based on the first PID being a default PID.

According to one or more embodiments of this aspect, the processing circuitry is further configured to determine, based on the registration accept message, a plurality of supported PIDs, the plurality of supported PIDs including the first PID and the target PID, where the target PID is associated with a target S-NSSAI. The processing circuitry is further configured to store the target PID and the target S-NSSAI.

According to one or more embodiments of this aspect, the determining of the switch from the first profile to the target profile is further based on at least one of: a financial cost associated with the target S-NSSAI, a network performance parameter associated with the target S-NSSAI, a time of day associated with the switch, and a user setting configured by a user of the wireless device, where the user setting is at least one of: a work setting, a personal setting, and a streaming setting.

According to one or more embodiments of this aspect, the switch request message is an uplink non-access-stratum (NAS) transport message including the target PID.

According to another aspect of the present disclosure, a method implemented in a wireless device configured to communicate with an AMF node and a UDM node is provided. The method includes determining to initiate a switch from a first profile associated with a first profile identifier, PID, to a target profile associated with a target PID. The method further includes causing transmission of a switch request message indicating the switch, the switch request message being configured to initiate the UDM node to activate the target profile. The method further includes at least one of causing transmission of and receiving signaling in accordance with the activated target profile associated with the target PID.

According to one or more embodiments of this aspect, the method further includes receiving a mobility registration message, and performing mobility registration based on the mobility registration message, where the mobility registration is configured to re-register with the AMF node before using the target profile.

According to one or more embodiments of this aspect, the method further includes storing a mapping of users of wireless devices to PIDs, and receiving a login credential associated with a user of the wireless device, the determining the switch from the first profile to the target profile being based on the user being mapped to the target PID.

According to one or more embodiments of this aspect, the method further includes causing transmission of a registration request message to the AMF node. The method further includes, in response to the transmission of the registration request message, receiving a registration accept message. The method further includes determining, based on the registration accept message, the first PID and an allowed first single-network slice selection assistance information, S-NSSAI, associated with the first PID. The method further includes at least one of causing transmission of and receiving signaling in accordance with the allowed S-NSSAI.

According to one or more embodiments of this aspect, the determining of the first PID is based on the first PID being a default PID.

According to one or more embodiments of this aspect, the method further includes determining, based on the registration accept message, a plurality of supported PIDs, the plurality of supported PIDs including the first PID and the target PID, where the target PID is associated with a target S-NSSAI. The method further includes storing the target PID and the target S-NSSAI.

According to one or more embodiments of this aspect, the determining of the switch from the first profile to the target profile is further based on at least one of: a financial cost associated with the target S-NSSAI, a network performance parameter associated with the target S-NSSAI, a time of day associated with the switch, and a user setting configured by a user of the wireless device, where the user setting is at least one of: a work setting, a personal setting, and a streaming setting.

According to one or more embodiments of this aspect, the switch request message is an uplink NAS transport message including the target PID.

According to another aspect of the present disclosure, an AMF node (i.e., a core node that is performing one or more AMF functions) that is configured to communicate with a UDM node (i.e., a core node that is performing one or more UDM functions) and with a wireless device is provided. The AMF node includes processing circuitry configured to receive a switch request message indicating the wireless device is initiating a switch from a first profile associated with a first profile identifier, PID, to a target profile associated with a target PID. The processing circuitry is further configured to receive an activation message indicating that the target profile associated with the target PID has been activated by the UDM node. The processing circuitry is further configured to determine a target single-network slice selection assistance information, S-NSSAI, associated with the wireless device based on the target profile. The processing circuitry is further configured to cause transmission of a configuration update to the wireless device enabling the wireless device to use the target S-NSSAI for signaling.

According to one or more embodiments of this aspect, the processing circuitry is further configured to cause the wireless device to perform mobility registration before the target PID is applied for the target profile.

According to one or more embodiments of this aspect, the processing circuitry is further configured to receive an indication indicating a plurality of PIDs and associated S-NSSAIs. The processing circuitry is further configured to determine a default PID of the plurality of PIDs based on the indication. The processing circuitry is further configured to determine an allowed S-NSSAI associated with the default PID. The processing circuitry is further configured to receive a registration request message from the wireless device. The processing circuitry is further configured to, in response to the receiving of the registration request message, cause transmission of a registration accept message to the wireless device, where the registration accept message indicates the default PID and the allowed S-NSSAI.

According to one or more embodiments of this aspect, the registration accept message further indicates the plurality of PIDs and associated S-NSSAIs. According to one or more embodiments of this aspect, the switch request message is an uplink NAS transport message including the target PID. According to one or more embodiments of this aspect, the first PID is associated with a first S-NSSAI, the first S-NSSAI is associated with a packet data unit, PDU, session, and the processing circuitry is further configured to, in response to the receiving of the switch request message, deactivate the PDU session based on the first S-NSSAI not being associated with the target PID. According to one or more embodiments of this aspect, the receiving of the switch request message is based on a login credential associated with the target PID being received by the wireless device. According to one or more embodiments of this aspect, the receiving of the switch request message is based on at least one of: a financial cost associated with the target S-NSSAI, a network performance parameter associated with the target S-NSSAI, a time of day associated with the switch, and a user setting configured by a user of the wireless device, where the user setting is at least one of: a work setting, a personal setting, and a streaming setting.

According to another aspect of the present disclosure, a method implemented in an AMF node (i.e., a core node that is performing one or more AMF functions) that is configured to communicate with a UDM node (i.e., a core node that is performing one or more UDM functions) and with a wireless device is provided. The method includes receiving a switch request message indicating the wireless device is initiating a switch from a first profile associated with a first profile identifier, PID, to a target profile associated with a target PID. The method further includes receiving an activation message indicating that the target profile associated with the target PID has been activated by the UDM node. The method further includes determining a target single-network slice selection assistance information, S-NSSAI, associated with the wireless device based on the target profile. The method further includes causing transmission of a configuration update to the wireless device enabling the wireless device to use the target S-NSSAI for signaling.

According to one or more embodiments of this aspect, the method further includes causing the wireless device to perform mobility registration before the target PID is applied for the target profile.

According to one or more embodiments of this aspect, the method further includes receiving an indication indicating a plurality of PIDs and associated S-NSSAIs. The method further includes determining a default PID of the plurality of PIDs based on the indication. The method further includes determining an allowed S-NSSAI associated with the default PID. The method further includes receiving a registration request message from the wireless device. The method further includes, in response to the receiving of the registration request message, causing transmission of a registration accept message to the wireless device, where the registration accept message indicates the default PID and the allowed S-NSSAI.

According to one or more embodiments of this aspect, the registration accept message further indicates the plurality of PIDs and associated S-NSSAIs. According to one or more embodiments of this aspect, the switch request message is an uplink NAS transport message including the target PID. According to one or more embodiments of this aspect, the first PID is associated with a first S-NSSAI, the first S-NSSAI is associated with a packet data unit, PDU, session, and the method further includes, in response to the receiving of the switch request message, deactivating the PDU session based on the first S-NSSAI not being associated with the target PID. According to one or more embodiments of this aspect, the receiving of the switch request message is based on a login credential associated with the target PID being received by the wireless device. According to one or more embodiments of this aspect, the receiving of the switch request message is based on at least one of: a financial cost associated with the target S-NSSAI, a network performance parameter associated with the target S-NSSAI, a time of day associated with the switch, and a user setting configured by a user of the wireless device, where the user setting is at least one of: a work setting, a personal setting, and a streaming setting. According to one or more embodiments of this aspect, the first PID is a default PID.

According to another aspect of the present disclosure, a UDM node (i.e., a core node that is performing one or more UDM functions) that is configured to communicate with a AMF node (i.e., a core node that is performing one or more AMF functions) and with a wireless device is provided. The UDM node includes processing circuitry configured to receive a switch request message indicating that the wireless device is initiating a switch from a first profile associated with a first profile identifier, PID, to a target profile associated with a target PID. The processing circuitry is further configured to switch the wireless device to the target profile, the switching including activating the target profile associated with the target PID. The processing circuitry is further configured to cause transmission, to the AMF, of an activation message, the activation message: indicating that the target profile has been activated, and being configured to cause the AMF to determine a target single-network slice selection assistance information, S-NSSAI, associated with the wireless device to allow the target PID to be applied for the target profile.

According to one or more embodiments of this aspect, the receiving of the switch request message is based on a login credential associated with the target PID being received by the wireless device. According to one or more embodiments of this aspect, the receiving of the switch request message is based on at least one of: a financial cost associated with the target S-NSSAI, a network performance parameter associated with the target S-NSSAI, a time of day associated with the switch, and a user setting configured by a user of the wireless device, where the user setting is at least one of: a work setting, a personal setting, and a streaming setting. According to one or more embodiments of this aspect, the first PID is a default PID. According to one or more embodiments of this aspect, the switch request message is an uplink NAS transport message including the target PID.

According to another aspect of the present disclosure, a method implemented in a UDM node (i.e., a core node that is performing one or more UDM functions) that is configured to communicate with a AMF node (i.e., a core node that is performing one or more AMF functions) and with a wireless device is provided. The method includes receiving a switch request message indicating that the wireless device is initiating a switch from a first profile associated with a first profile identifier, PID, to a target profile associated with a target PID. The method further includes switching the wireless device to the target profile, the switching including activating the target profile associated with the target PID. The method further includes causing transmission, to the AMF, of an activation message, the activation message: indicating that the target profile has been activated, and being configured to cause the AMF to determine a target single-network slice selection assistance information, S-NSSAI, associated with the wireless device to allow the target PID to be applied for the target profile.

According to one or more embodiments of this aspect, the receiving of the switch request message is based on a login credential associated with the target PID being received by the wireless device. According to one or more embodiments of this aspect, the receiving of the switch request message is based on at least one of: a financial cost associated with the target S-NSSAI, a network performance parameter associated with the target S-NSSAI, a time of day associated with the switch, and a user setting configured by a user of the wireless device, where the user setting is at least one of: a work setting, a personal setting, and a streaming setting. According to one or more embodiments of this aspect, the first PID is a default PID. According to one or more embodiments of this aspect, the switch request message is an uplink NAS transport message including the target PID.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
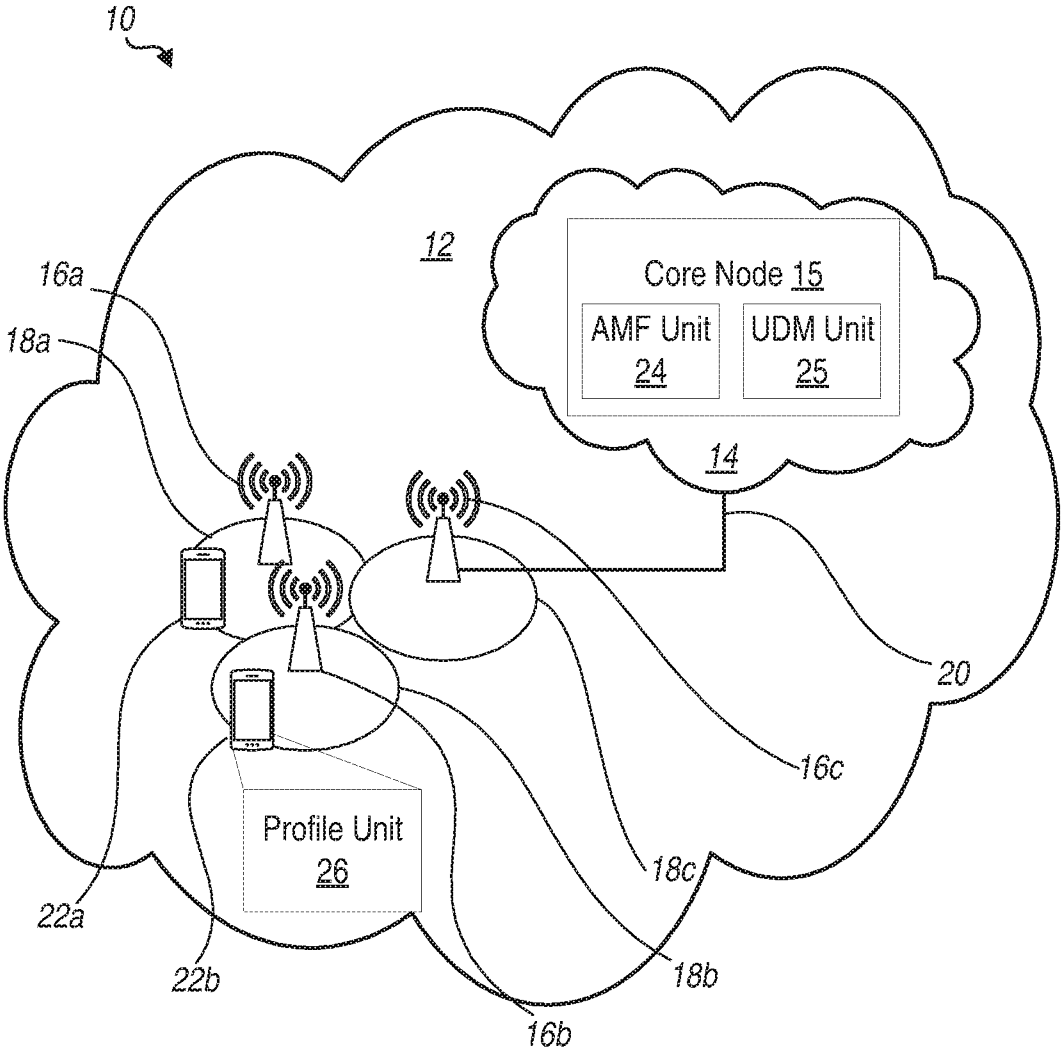
FIG. 1 is a schematic diagram of an example network architecture illustrating a communication system according to principles disclosed herein.

Before describing in detail example embodiments, it is noted that the embodiments reside primarily in combinations of apparatus components and processing steps related to wireless device initiated profile switching. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein.

As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication. For example, in a scenario where a first device communicates a transmission to a second device, where such transmission is destined for a third device, the first device is "in communication with" both the second device and the third device. As another example, a first device may be in communication with a second device where such communication is transmitted (directly or indirectly) via one or more third devices (e.g., intermediate devices).

In some embodiments described herein, the term "coupled," "connected," and the like, may be used herein to indicate a connection, although not necessarily directly, and may include wired and/or wireless connections.

The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising." "includes" and/or "including" when used herein, specify the presence of stated features, integers, steps, operations, elements, and/or components, but do not preclude the presence or addition of one or more other features, integers, steps, operations, elements, components, and/or groups thereof.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Transmitting in downlink may pertain to transmission from the network or network node to the wireless device. Transmitting in uplink may pertain to transmission from the wireless device to the network or network node. Transmitting in sidelink may pertain to (direct) transmission from one wireless device to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments are directed to configuration and implementation of wireless device initiated profile switching such as based on a PID concept.

Referring to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14 including one or more core nodes 15 (collectively referred to as core node 15). The access network 12 comprises a plurality of network nodes 16*a*, 16*b*, 16*c* (referred to collectively as network nodes 16), such as NBs, eNBs, gNBs or other types of wireless access points, each defining a corresponding coverage area 18*a*, 18*b*, 18*c* (referred to collectively as coverage areas 18). Each network node 16*a*, 16*b*, 16*c* is connectable to the core network 14 over a wired or wireless connection 20. A first wireless device (WD) 22*a* located in coverage area 18*a* is configured to wirelessly connect to, or be paged by, the corresponding network node 16*a*. A second wireless device 22*b* in coverage area 18*b* is wirelessly connectable to the corresponding network node 16*b*. While a plurality of wireless devices 22*a*, 22*b* (collectively referred to as wireless devices 22) are illustrated in this example, the disclosed embodiments are equally applicable to a situation where a sole wireless device 22 is in the coverage area or where a sole wireless device 22 is connecting to the corresponding network node 16. Note that although only two wireless devices 22 and three network nodes 16 are shown for convenience, the communication system may include many more wireless devices 22 and network nodes 16.

Also, it is contemplated that a wireless device 22 can be in simultaneous communication and/or configured to separately communicate with more than one network node 16 and more than one type of network node 16. For example, a wireless device 22 can have dual connectivity with a network node 16 that supports LTE and the same or a different network node 16 that supports NR. As an example, wireless device 22 can be in communication with an eNB for LTE/E-UTRAN and a gNB for NR/NG-RAN.

Core node 15 may be configured to include an AMF unit 24 that is configured to perform one or more AMF functions as described herein such as with respect to profile switching. Core node 15 may be configured to include a UDM unit 25 that is configured to perform one or more UDM functions as described herein such as with respect to profile switching. A wireless device 22 may be configured to include a profile unit 26 which is configured to perform one or more wireless device 22 functions such as with respect to profile switching as described herein.

Example implementations, in accordance with an embodiment, of the wireless device 22, core node 15, and network node 16 discussed in the preceding paragraphs will now be described with reference to FIG. 2.

The communication system 10 includes a network node 16 provided in a communication system 10 and including hardware 28 enabling it to communicate with the wireless device 22 and core node 15. The hardware 28 may include a radio interface 30 for setting up and maintaining at least a wireless connection 32 with a wireless device 22 located in a coverage area 18 served by the network node 16. The radio interface 30 may be formed as or may include, for example, one or more RF transmitters, one or more RF receivers, and/or one or more RF transceivers. The radio interface 30 includes an array of antennas 34 to radiate and receive signal(s) carrying electromagnetic waves. Further, hardware 28 may include communication interface 31 for setting up communication with one or more core nodes 15.

In the embodiment shown, the hardware 28 of the network node 16 further includes processing circuitry 36. The processing circuitry 36 may include a processor 38 and a memory 40. In particular, in addition to or instead of a processor, such as a central processing unit, and memory, the processing circuitry 36 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 38 may be configured to access (e.g., write to and/or read from) the memory 40, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 42 stored internally in, for example, memory 40, or stored in external memory (e.g., database, storage array, network storage device, etc.) accessible by the network node 16 via an external connection. The software 42 may be executable by the processing circuitry 36. The processing circuitry 36 may be configured to control any of the methods and/or processes described herein and/or to cause such methods, and/or processes to be performed, e.g., by network node 16. Processor 38 corresponds to one or more processors 38 for performing network node 16 functions described herein. The memory 40 is configured to store data, programmatic software code and/or other information described herein. In some embodiments, the software 42 may include instructions that, when executed by the processor 38 and/or processing circuitry 36, causes the processor 38 and/or processing circuitry 36 to perform the processes described herein with respect to network node 16.

The communication system 10 further includes the wireless device 22 already referred to. The wireless device 22 may have hardware 44 that may include a radio interface 46 configured to set up and maintain a wireless connection 32 with a network node 16 serving a coverage area 18 in which the wireless device 22 is currently located. The radio interface 46 may be formed as or may include, for example, one or more RF transmitters, one or more RF receivers, and/or one or more RF transceivers. The radio interface 46 includes an array of antennas 48 to radiate and receive signal(s) carrying electromagnetic waves.

The hardware 44 of the wireless device 22 further includes processing circuitry 50. The processing circuitry 50 may include a processor 52 and memory 54. In particular, in addition to or instead of a processor, such as a central processing unit, and memory, the processing circuitry 50 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 52 may be configured to access (e.g., write to and/or read from) memory 54, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the wireless device 22 may further comprise software 56, which is stored in, for example, memory 54 at the wireless device 22, or stored in external memory (e.g., database, storage array, network storage device, etc.) accessible by the wireless device 22. The software 56 may be executable by the processing circuitry 50. The software 56 may include a client application 58. The client application 58 may be operable to provide a service to a human or non-human user via the wireless device 22.

The processing circuitry 50 may be configured to control any of the methods and/or processes described herein and/or to cause such methods, and/or processes to be performed, e.g., by wireless device 22. The processor 52 corresponds to one or more processors 52 for performing wireless device 22 functions described herein. The wireless device 22 includes memory 54 that is configured to store data, programmatic software code and/or other information described herein. In some embodiments, the software 56 and/or the client application 58 may include instructions that, when executed by the processor 52 and/or processing circuitry 50, causes the processor 52 and/or processing circuitry 50 to perform the processes described herein with respect to wireless device 22. For example, the processing circuitry 50 of the wireless device 22 may include profile unit 26 which is configured to perform one or more wireless device 22 functions such as with respect to profile switching as described herein.

The communication system 10 includes core node 15 that is configured to perform one or more core network functions, i.e., provide/function as one or more core network entities such as an AMF node 15, UDM node 15, etc. Core node 15 includes including hardware 60 enabling it to communicate with network node 16 and wireless device 22 such as via network node 16. The hardware 60 may optionally include a radio interface 62 for performing wireless communications. The radio interface 62 may be formed as or may include, for example, one or more RF transmitters, one or more RF receivers, and/or one or more RF transceivers. Further, hardware 60 may include communication interface 64 for setting up communication with one or more core nodes 15.

In the embodiment shown, the hardware 60 of the core node 15 further includes processing circuitry 66. The processing circuitry 66 may include a processor 68 and a memory 70. In particular, in addition to or instead of a processor, such as a central processing unit, and memory, the processing circuitry 66 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 68 may be configured to access (e.g., write to and/or read from) the memory 70, which may comprise any kind of volatile and/or nonvolatile memory. e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 72 stored internally in, for example, memory 70, or stored in external memory (e.g., database, storage array, network storage device, etc.) accessible by the core node 15 via an external connection. The software 72 may be executable by the processing circuitry 66. The processing circuitry 66 may be configured to control any of the methods and/or processes described herein and/or to cause such methods, and/or processes to be performed, e.g., by core node 15. Processor 68 corresponds to one or more processors 68 for performing core node 15 functions described herein. The memory 70 is configured to store data, programmatic software code and/or other information described herein. In some embodiments, the software 72 may include instructions that, when executed by the processor 68 and/or processing circuitry 66, causes the processor 68 and/or processing circuitry 66 to perform the processes described herein with respect to core node 15. For example, processing circuitry 66 of core node 15 may include AMF unit 24 which is configured to perform one or more AMF functions such as with respect to wireless device initiated profile switching as described herein. That is, core node 15 may act as and/or provide an AMF entity (i.e., AMF node 15) if core node 15 has AMF unit 24. For example, processing circuitry 66 of core node 15 may include UDM unit 25 which is configured to perform one or more UDM functions such as with respect to wireless device initiated profile switching as described herein. In other words, core node 15 may act as and/or provide a UDM entity (i.e., UDM node 15) if core node 15 has UDM unit 25. Core node 15 may include both units 24 and 25 such that core node 15 provides both an AMF entity (i.e., AMF node 15) and UDM node 15. Core node 15 may include other core node entities such as SMF, etc. and corresponding software/hardware to perform respective functionality.

Figure 2:
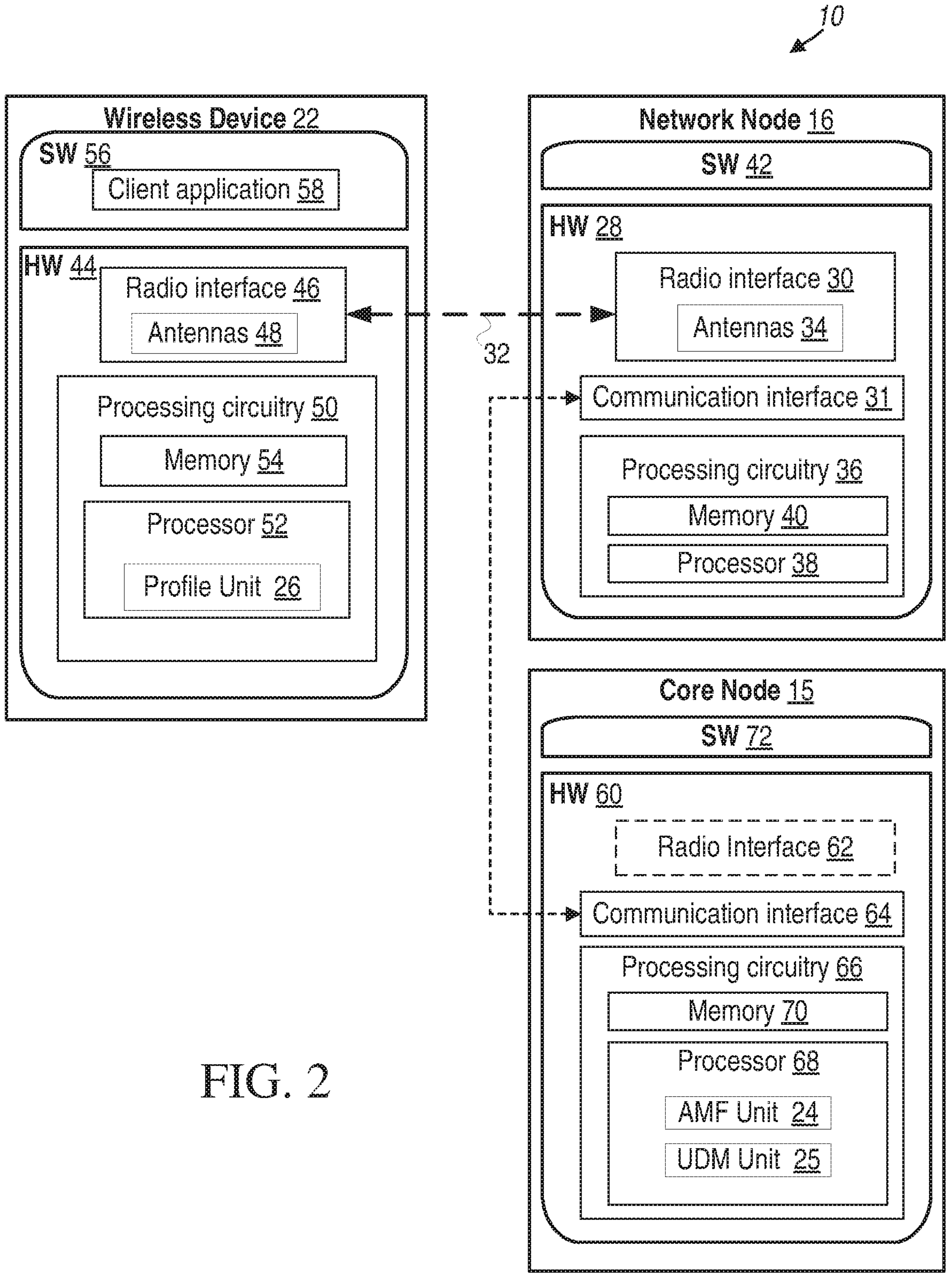
FIG. 2 is a block diagram of a network node in communication with a wireless device over a wireless connection and with a core node according to some embodiments of the present disclosure.

In some embodiments, the inner workings of the core node 15, network node 16, and wireless device 22 may be as shown in FIG. 2 and independently, the surrounding network topology may be that of FIG. 1.

The wireless connection 32 between the wireless device 22 and the network node 16 is in accordance with the teachings of the embodiments described throughout this disclosure. More precisely, the teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve.

Although FIGS. 1 and 2 show various "units" such as AMF unit 24, UDM unit 25 and profile unit 26 as being within a respective processor, it is contemplated that these units may be implemented such that a portion of the unit is stored in a corresponding memory within the processing circuitry. In other words, the units may be implemented in hardware or in a combination of hardware and software within the processing circuitry. Further, while AMF unit 24 and UDM unit 25 are illustrated as being in a same core node 15 in FIG. 2, respective core nodes 15 may implement respective core network functions such that a first core node 15 may be configured with AMF unit 24 while a second core node 15 may be configured with UDM unit 25.

Figure 3:
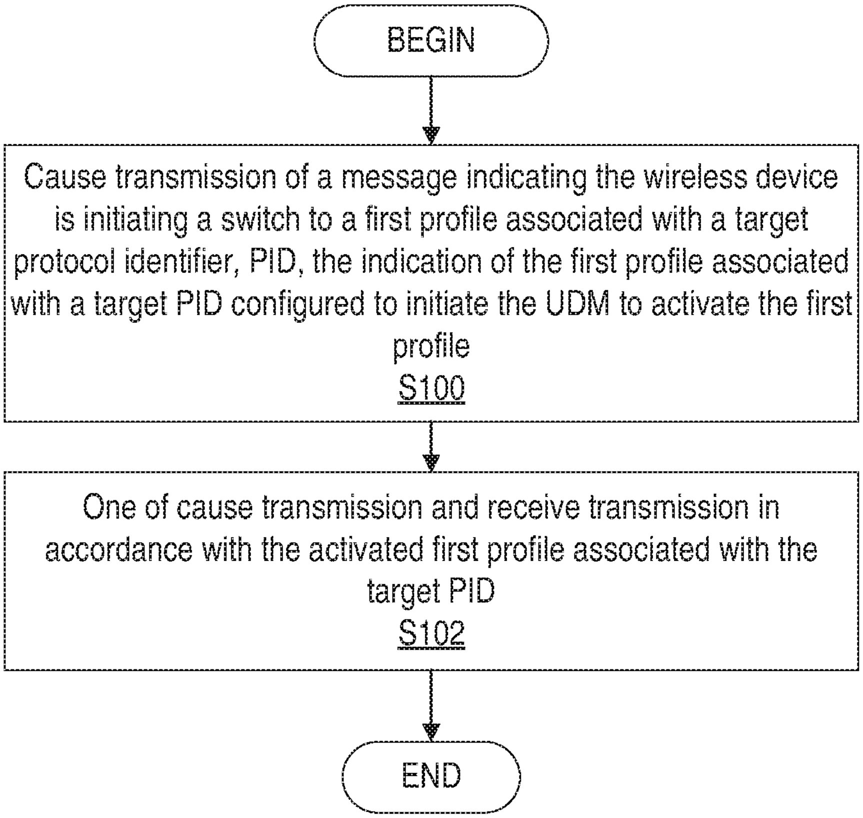
FIG. 3 is a flowchart of an example process in a wireless device according to some embodiments of the present disclosure.

FIG. 3 is a flowchart of an example process in a wireless device 22 according to some embodiments of the present disclosure. One or more blocks described herein may be performed by one or more elements of wireless device 22 such as by one or more of processing circuitry 50 (including the profile unit 26), processor 52, and/or radio interface 46. Wireless device 22 is configured to cause (Block S100) transmission of a message indicating the wireless device 22 is initiating a switch to a first profile associated with a target profile identifier, PID, where the indication of the first profile associated with a target PID configured to initiate the UDM node 15 to activate the first profile, as described herein. Wireless device 22 is configured to one of cause transmission and receive transmission (Block S102) in accordance with the activated first profile associated with the target PID, as described herein.

According to one or more embodiments, the processing circuitry is further configured to: receive mobility registration signaling that is configured to cause the wireless device 22 to re-register with the AMF node 15 before using the first profile, and perform mobility registration with the AMF node 15 for profile switching, as described herein.

Figure 4:
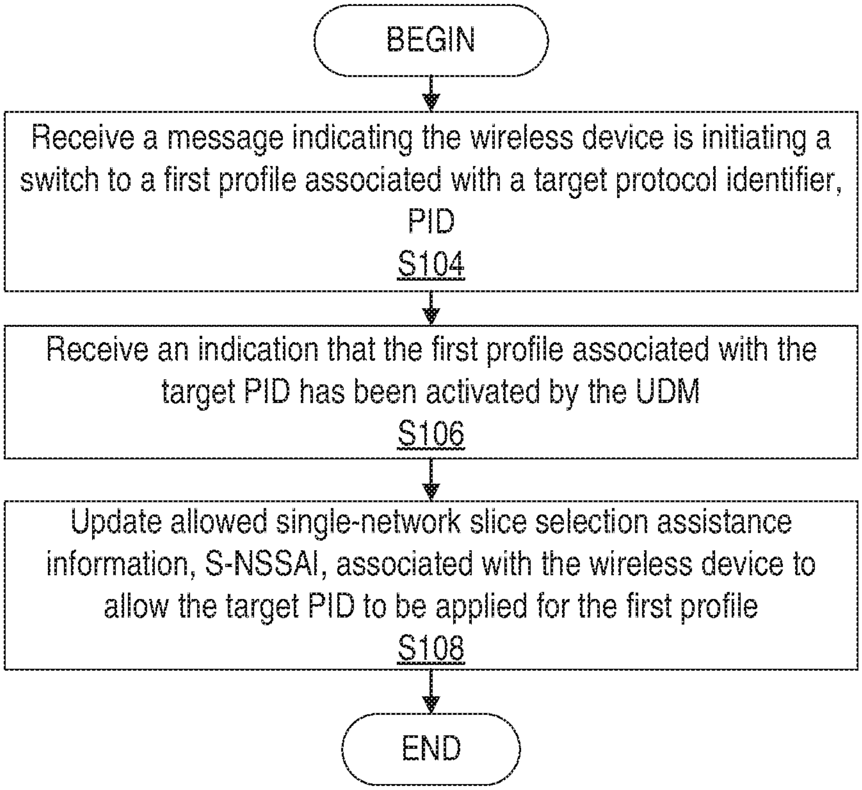
FIG. 4 is a flowchart of an example process in a core node such as an AMF node according to some embodiments of the present disclosure.

FIG. 4 is a flowchart of an example process in a AMF node 15 (i.e., a core node 15 that is performing one or more AMF functions) in accordance with one or more embodiments of the present disclosure. One or more blocks described herein may be performed by one or more elements of core node 15 such as by one or more of processing circuitry 66 (including the AMF unit 24), processor 68, and/or radio interface 62. Core node 15 (i.e., AMF node 15) is configured to receive (Block S104) a message indicating the wireless device 22 is initiating a switch to a first profile associated with a target profile identifier, PID, as described herein. Core node 15 is configured to receive (Block S106) an indication that the first profile associated with the target PID has been activated by the UDM node 15, as described herein. Core node 15 is configured to update (Block S108) allowed single-network slice selection assistance information, S-NSSAI, associated with the wireless device 22 to allow the target PID to be applied for the first profile, as described herein.

According to one or more embodiments, the processing circuitry 66 is further configured to store a plurality of profiles and a plurality of S-NSSAIs that are usable by the wireless device 22 for profile switching where the plurality of profiles includes the first profile, as described herein. According to one or more embodiments, the processing circuitry 66 is further configured to cause the wireless device 22 to perform mobility registration before the target PID is applied for the first profile, as described herein. According to one or more embodiments, the message indicates the wireless device 22 is initiating the switch to the first profile associated with the target PID is an uplink NAS transport message including the target PID.

Figure 5:
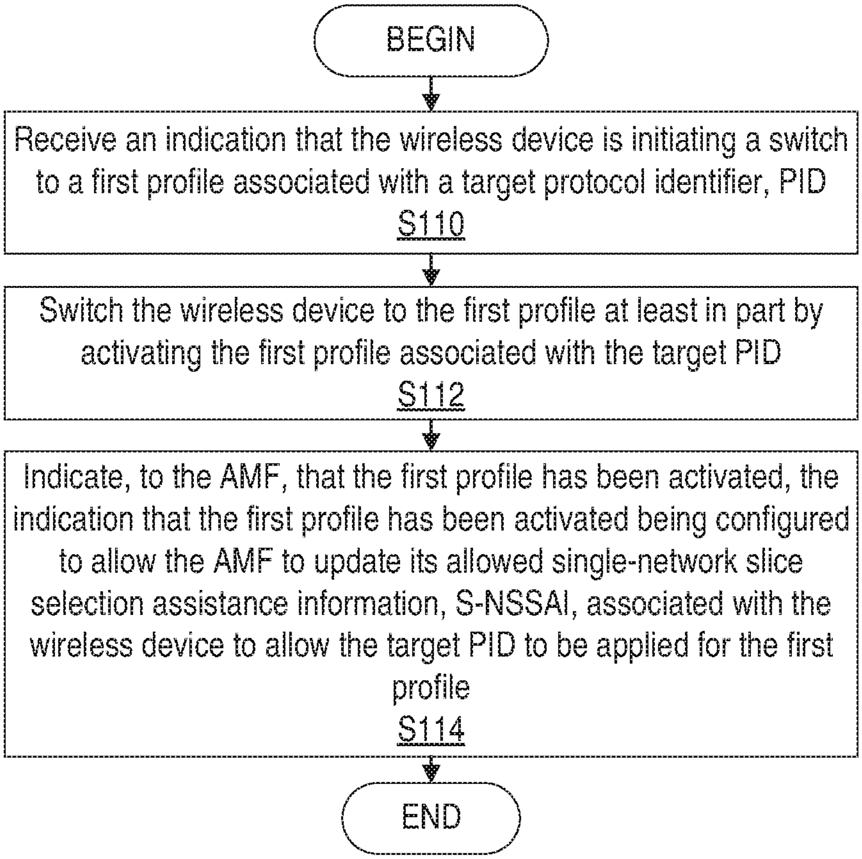
FIG. 5 is a flowchart of an example process in a core node such as a UDM node according to some embodiments of the present disclosure.

FIG. 5 is a flowchart of an example process in a core node 15 that is performing one or more UDM node 15 functions in accordance with one or more embodiments of the present disclosure. One or more blocks described herein may be performed by one or more elements of core node 15 such as by one or more of processing circuitry 66 (including the UDM unit 25), processor 68, and/or radio interface 62. Core node 15 (i.e., UDM node 15) is configured to receive (Block S110) an indication that the wireless device 22 is initiating a switch to a first profile associated with a target profile identifier, PID, as described herein. Core node 15 is configured to switch (Block S112) the wireless device 22 to the first profile at least in part by activating the first profile associated with the target PID, as described herein. Core node 15 is configured to indicate (Block S114), to the AMF node 15, that the first profile has been activated where the indication that the first profile has been activated is configured to allow the AMF node 15 to update its allowed single-network slice selection assistance information, S-NSSAI, associated with the wireless device 22 to allow the target PID to be applied for the first profile, as described herein.

Figure 6:
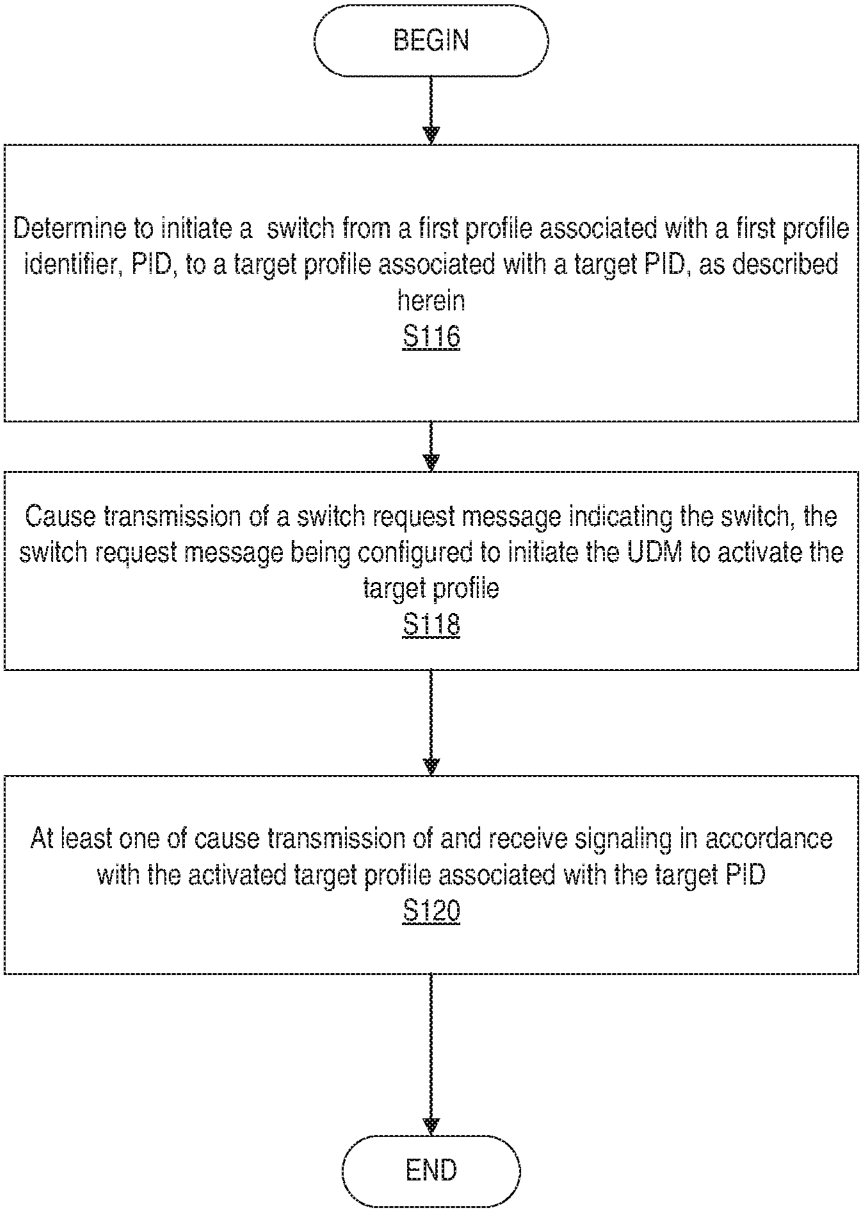
FIG. 6 is a flowchart of another example process in a wireless device according to some embodiments of the present disclosure.

FIG. 6 is a flowchart of an example process in a wireless device 22 according to some embodiments of the present disclosure. One or more blocks described herein may be performed by one or more elements of wireless device 22 such as by one or more of processing circuitry 50 (including the profile unit 26), processor 52, and/or radio interface 46. Wireless device 22 is configured to determine (Block S116) to initiate a switch from a first profile associated with a first profile identifier, PID, to a target profile associated with a target PID, as described herein. Wireless device 22 is configured to cause transmission (Block S118) of a switch request message indicating the switch, the switch request message being configured to initiate the UDM node 15 to activate the target profile, as described herein. Wireless device 22 is configured to at least one of cause transmission of and receive (Block S120) signaling in accordance with the activated target profile associated with the target PID, as described herein.

According to one or more embodiments, the processing circuitry 50 is further configured to receive a mobility registration message, and to perform mobility registration based on the mobility registration message, where the mobility registration is configured to re-register with the AMF node 15 before using the target profile, as described herein.

According to one or more embodiments, the processing circuitry 50 is further configured to store a mapping of users of wireless devices 22 to PIDs, and to receive a login credential associated with a user of the wireless device 22, the determining the switch from the first profile to the target profile being based on the user being mapped to the target PID, as described herein.

According to one or more embodiments, the processing circuitry 50 is further configured to cause transmission of a registration request message to the AMF node 15. The processing circuitry 50 is further configured to, in response to the transmission of the registration request message, receive a registration accept message. The processing circuitry 50 is further configured to determine, based on the registration accept message, the first PID and an allowed first single-network slice selection assistance information, S-NSSAI, associated with the first PID. The processing circuitry 50 is further configured to at least one of cause transmission of and receive signaling in accordance with the allowed S-NSSAI, as described herein.

According to one or more embodiments, the determining of the first PID is based on the first PID being a default PID, as described herein.

According to one or more embodiments, the processing circuitry 50 is further configured to determine, based on the registration accept message, a plurality of supported PIDs, the plurality of supported PIDs including the first PID and the target PID, where the target PID is associated with a target S-NSSAI. The processing circuitry 50 is further configured to store the target PID and the target S-NSSAI, as described herein.

According to one or more embodiments, the determining of the switch from the first profile to the target profile is further based on at least one of: a financial cost associated with the target S-NSSAI, a network performance parameter associated with the target S-NSSAI, a time of day associated with the switch, and a user setting configured by a user of the wireless device 22, where the user setting is at least one of: a work setting, a personal setting, and a streaming setting.

Figure 7:
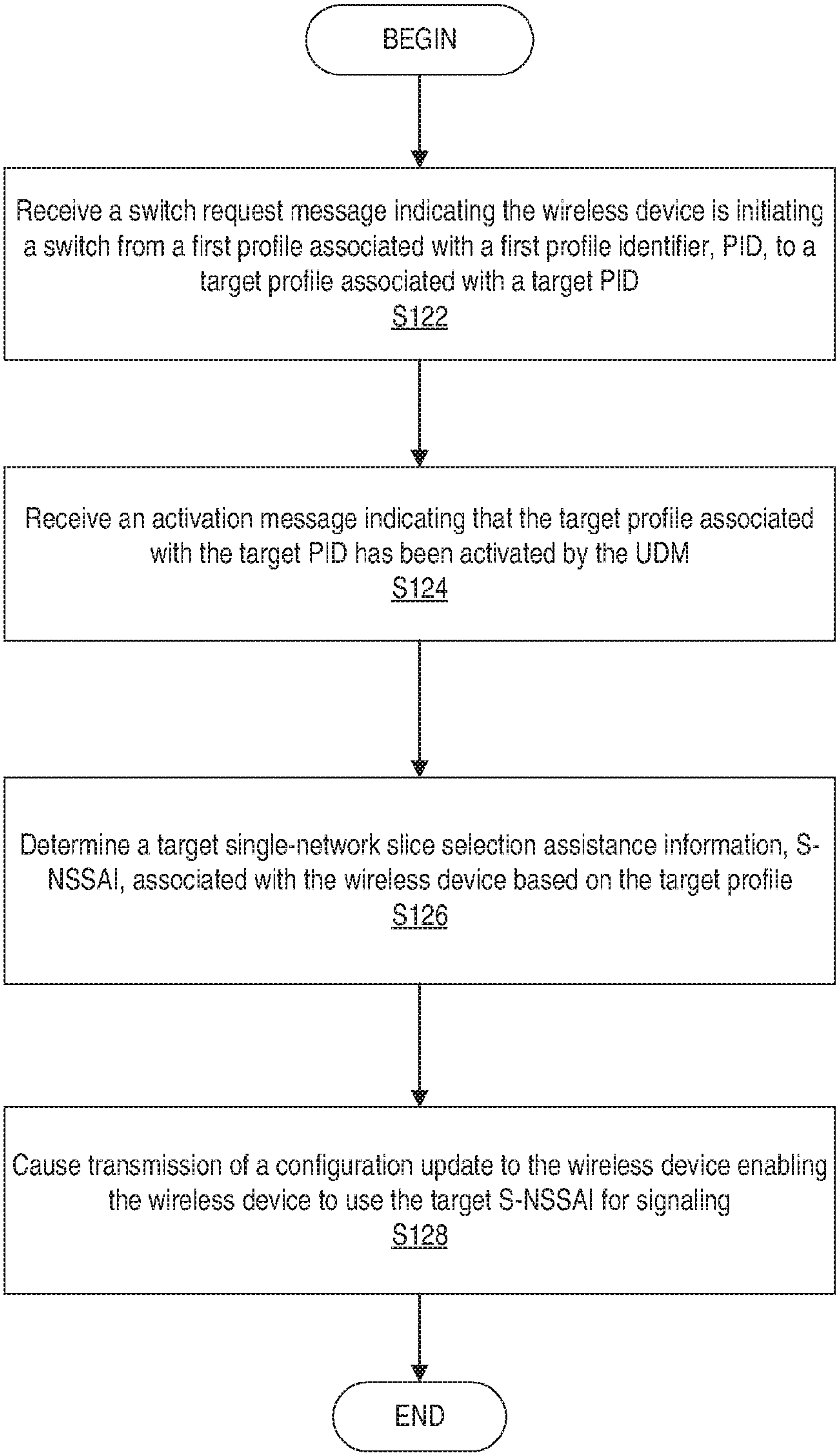
FIG. 7 is a flowchart of another example process in a core node such as an AMF node according to some embodiments of the present disclosure.

According to one or more embodiments, the switch request message is an uplink NAS transport message including the target PID, as described herein FIG. 7 is a flowchart of an example process in an AMF node 15 (i.e., a core node 15 that is performing one or more AMF functions) in accordance with one or more embodiments of the present disclosure. One or more blocks described herein may be performed by one or more elements of core node 15 such as by one or more of processing circuitry 66 (including the AMF unit 24), processor 68, and/or radio interface 62. AMF node 15 (i.e., core node 15) is configured to receive (Block S122) a switch request message indicating the wireless device 22 is initiating a switch from a first profile associated with a first profile identifier, PID, to a target profile associated with a target PID, as described herein. AMF node 15 (i.e., core node 15) is configured to receive (Block S124) an activation message indicating that the target profile associated with the target PID has been activated by the UDM node 15 (i.e., core node 15), as described herein. AMF node 15 (i.e., core node 15) is configured to determine (Block S126) a target single-network slice selection assistance information, S-NSSAI, associated with the wireless device 22 based on the target profile, as described herein. AMF node 15 (i.e., core node 15) is configured to cause transmission (Block S128) of a configuration update to the wireless device 22 enabling the wireless device 22 to use the target S-NSSAI for signaling, as described herein.

According to one or more embodiments, the processing circuitry 66 is further configured to cause the wireless device 22 to perform mobility registration before the target PID is applied for the target profile, as described herein.

According to one or more embodiments, the processing circuitry 66 is further configured to receive an indication indicating a plurality of PIDs and associated S-NSSAIs. The processing circuitry 66 is further configured to determine a default PID of the plurality of PIDs based on the indication. The processing circuitry 66 is further configured to determine an allowed S-NSSAI associated with the default PID. The processing circuitry 66 is further configured to receive a registration request message from the wireless device 22. The processing circuitry 66 is further configured to, in response to the receiving of the registration request message, cause transmission of a registration accept message to the wireless device 22, where the registration accept message indicates the default PID and the allowed S-NSSAI, as described herein.

According to one or more embodiments, the registration accept message further indicates the plurality of PIDs and associated S-NSSAIs, as described herein. According to one or more embodiments, the switch request message is an uplink NAS transport message including the target PID, as described herein. According to one or more embodiments, the first PID is associated with a first S-NSSAI, the first S-NSSAI is associated with a packet data unit, PDU, session, and the processing circuitry 66 being further configured to, in response to the receiving of the switch request message, deactivate the PDU session based on the first S-NSSAI not being associated with the target PID, as described herein. According to one or more embodiments, the receiving of the switch request message is based on a login credential associated with the target PID being received by the wireless device 22, as described herein. According to one or more embodiments, According to one or more embodiments of this aspect, the receiving of the switch request message is based on at least one of: a financial cost associated with the target S-NSSAI, a network performance parameter associated with the target S-NSSAI, a time of day associated with the switch, and a user setting configured by a user of the wireless device 22, where the user setting is at least one of: a work setting, a personal setting, and a streaming setting. According to one or more embodiments, the first PID is a default PID, as described herein.

Figure 8:
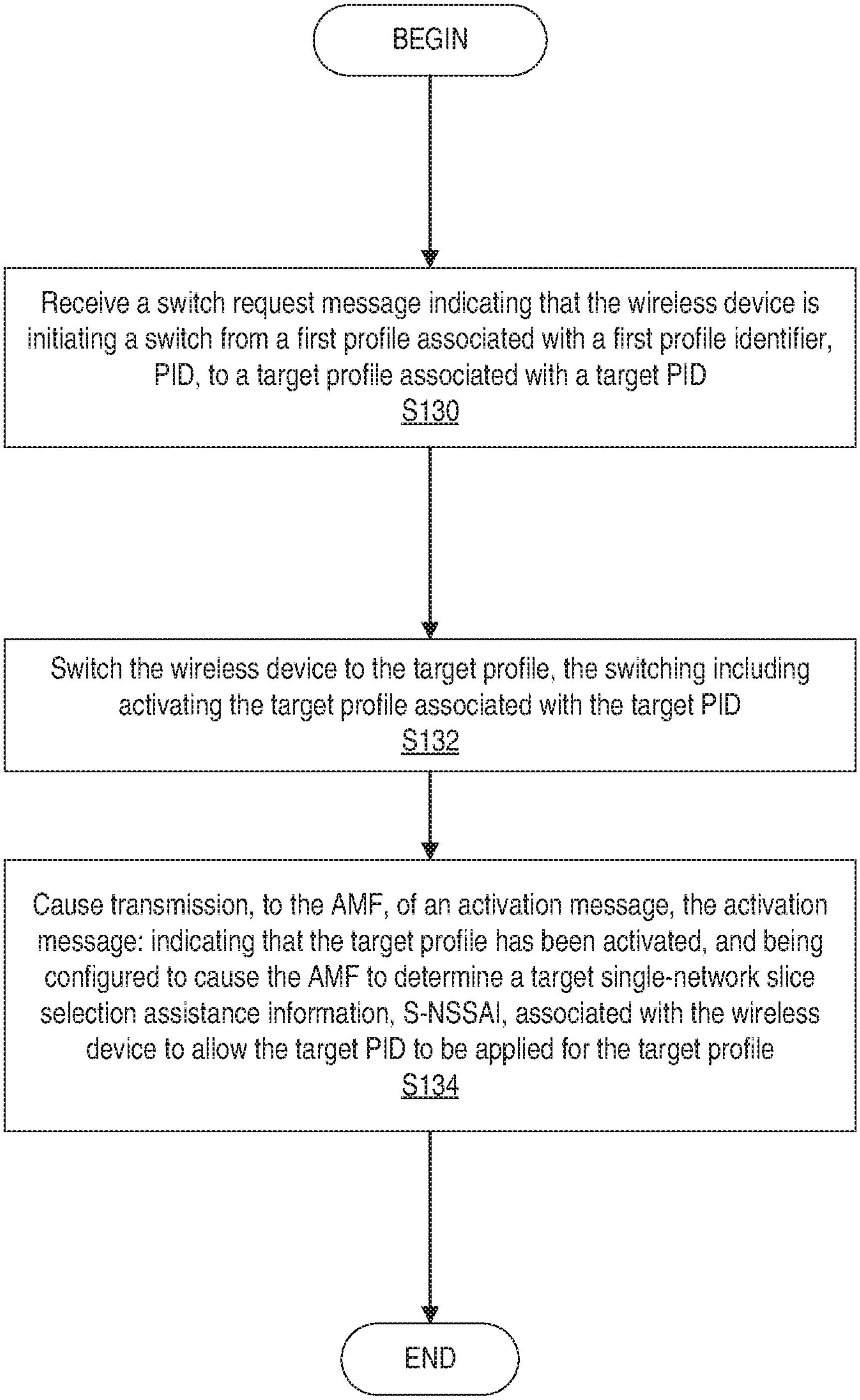
FIG. 8 is a flowchart of an example process in a core node such as a UDM node according to some embodiments of the present disclosure.

FIG. 8 is a flowchart of an example process in a UDM node (i.e., core node 15 that is performing one or more UDM functions) in accordance with one or more embodiments of the present disclosure. One or more blocks described herein may be performed by one or more elements of core node 15 such as by one or more of processing circuitry 66 (including the UDM unit 25), processor 68, and/or radio interface 62. UDM node 15 is configured to receive (Block S130) a switch request message indicating that the wireless device 22 is initiating a switch from a first profile associated with a first profile identifier, PID, to a target profile associated with a target PID, as described herein. UDM node 15 is configured to switch (Block S132) the wireless device 22 to the target profile, the switching including activating the target profile associated with the target PID, as described herein. UDM node 15 is configured to cause transmission (Block S134), to the AMF node 15, of an activation message, the activation message: indicating that the target profile has been activated, and being configured to cause the AMF node 15 to determine a target single-network slice selection assistance information, S-NSSAI, associated with the wireless device 22 to allow the target PID to be applied for the target profile, as described herein.

According to one or more embodiments, the receiving of the switch request message is based on a login credential associated with the target PID being received by the wireless device 22, as described herein. According to one or more embodiments, According to one or more embodiments of this aspect, the receiving of the switch request message is based on at least one of: a financial cost associated with the target S-NSSAI, a network performance parameter associated with the target S-NSSAI, a time of day associated with the switch, and a user setting configured by a user of the wireless device 22, where the user setting is at least one of: a work setting, a personal setting, and a streaming setting. According to one or more embodiments, the first PID is a default PID, as described herein. According to one or more embodiments, the switch request message is an uplink NAS transport message including the target PID, as described herein.

Having described the general process flow of arrangements of the disclosure and having provided examples of hardware and software arrangements for implementing the processes and functions of the disclosure, the sections below provide details and examples of arrangements for profile switching such as wireless device 22 initiated profile switching.

Some embodiments provide wireless device initiated profile switching including configuration and implementation of the profile switching.

Figure 9:
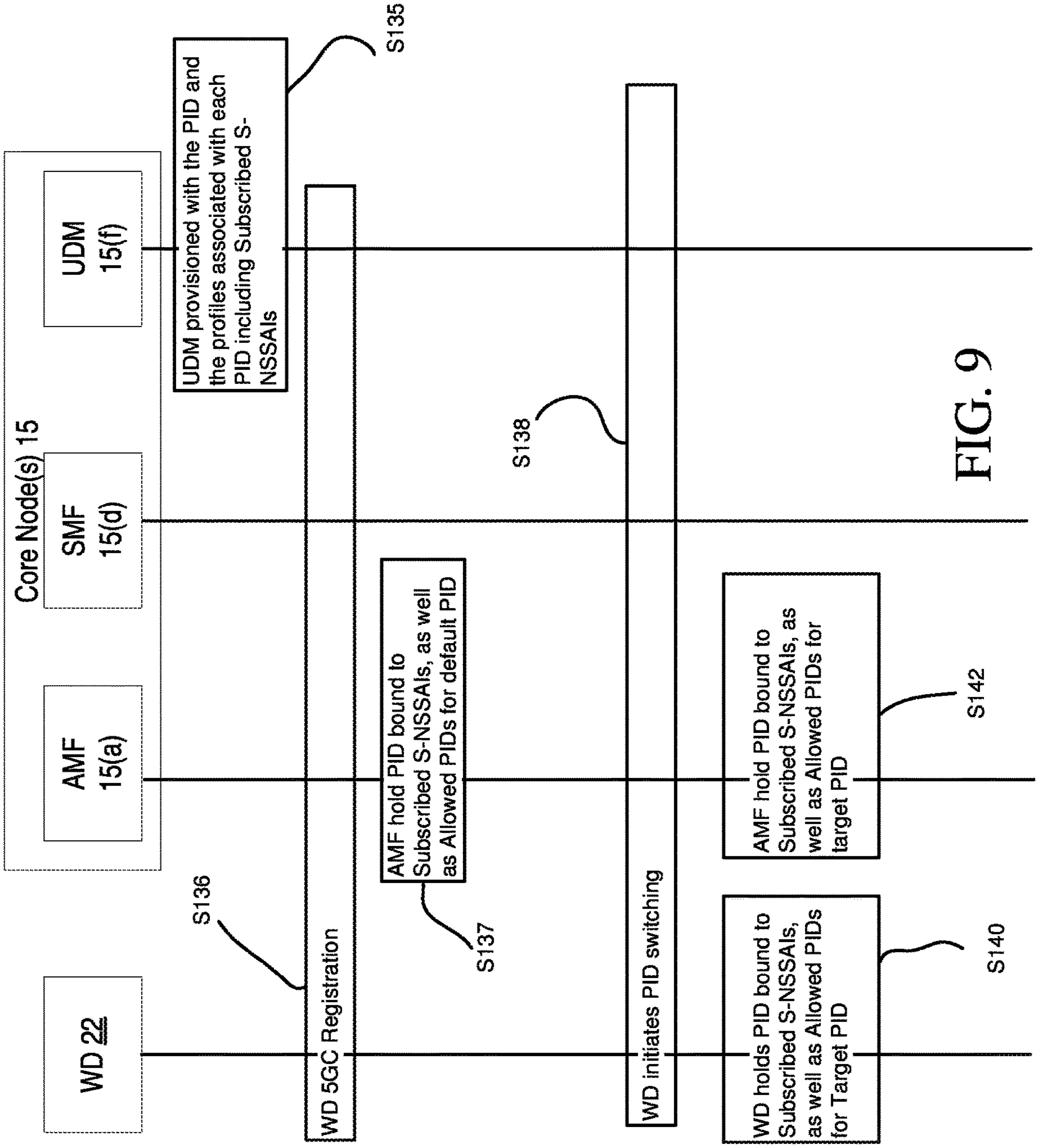
FIG. 9 is a diagram of a high level view of data held in different entities according to one or more embodiments of the present disclosure.

FIG. 9 is a high level diagram of data held in different entities according to one or more embodiments of the present disclosure, including wireless device 22 and one or more core nodes 15 including AMF node 15(*a*), SMF node 15(*d*), and UDM node 15(*f*), which may be co-located in a single core node 15 or distributed across multiple core nodes 15. In Step S135, the UDM node 15(*f*) is provisioned with the PID and the profiles associated with each PID including Subscribed S-NSSAIs. In Step S136, the wireless device 5GC registration is performed. In Step S137, the AMF node 15(*a*) holds PID(s) bound to Subscribed S-NSSAI(s), as well as Allowed PID(s)/S-NSSAIs for the default PID. In Step S138, the wireless device 22 initiates PID switching. In Step S140, the wireless device 22 holds PID(s) bound to Subscribed S-NSSAIs, as well as Allowed PID(s) for the Target PID. In Step S142, the AMF node 15(*a*) holds PID(s) bound to Subscribed S-NSSAIs, as well as Allowed PID(s) for the Target PID.

Initial Registration with Default PID

Figure 10A:
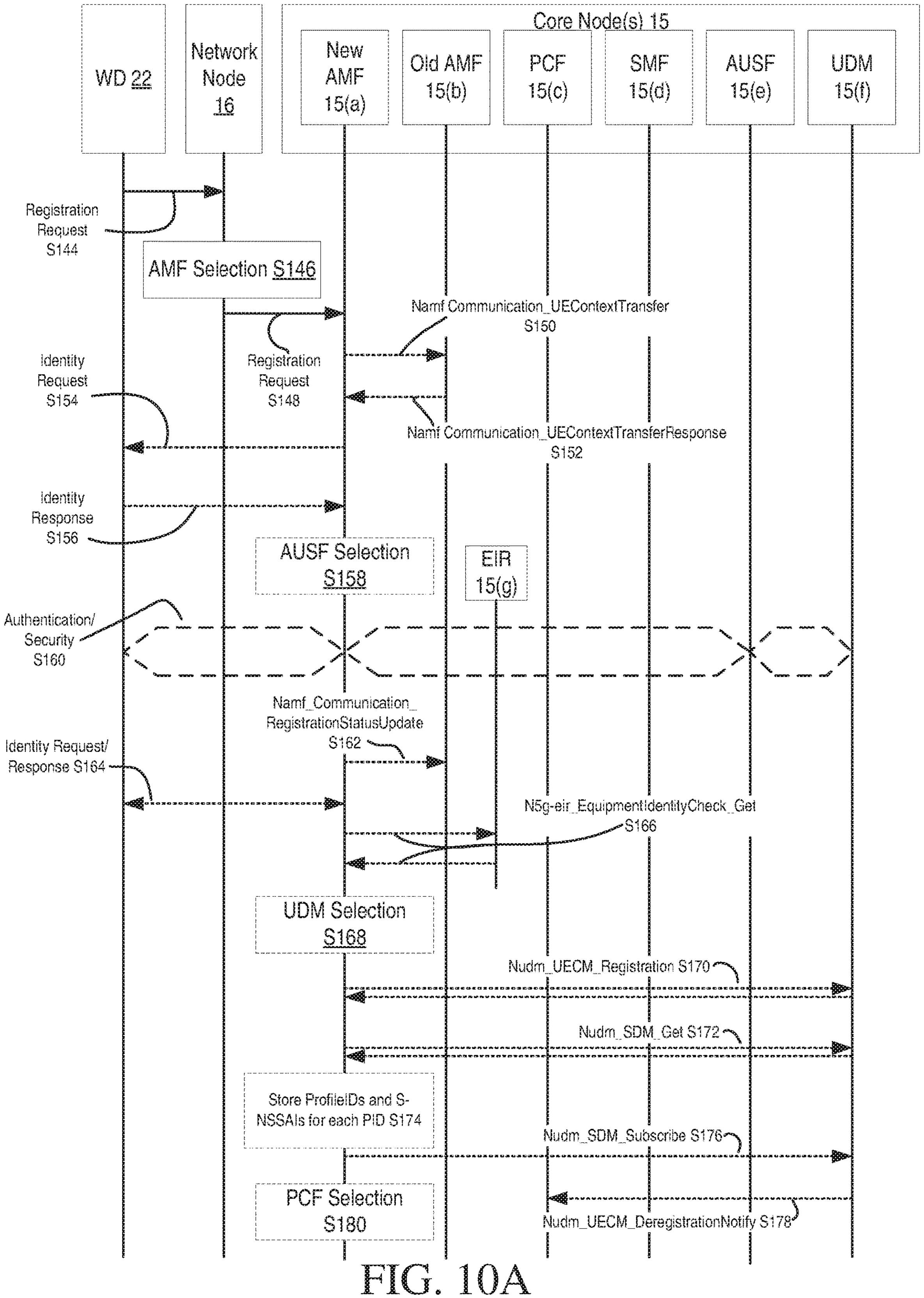
FIGS. 10A-10B are diagrams of a registration procedure according to one or more embodiments of the present disclosure.
Figure 10B:
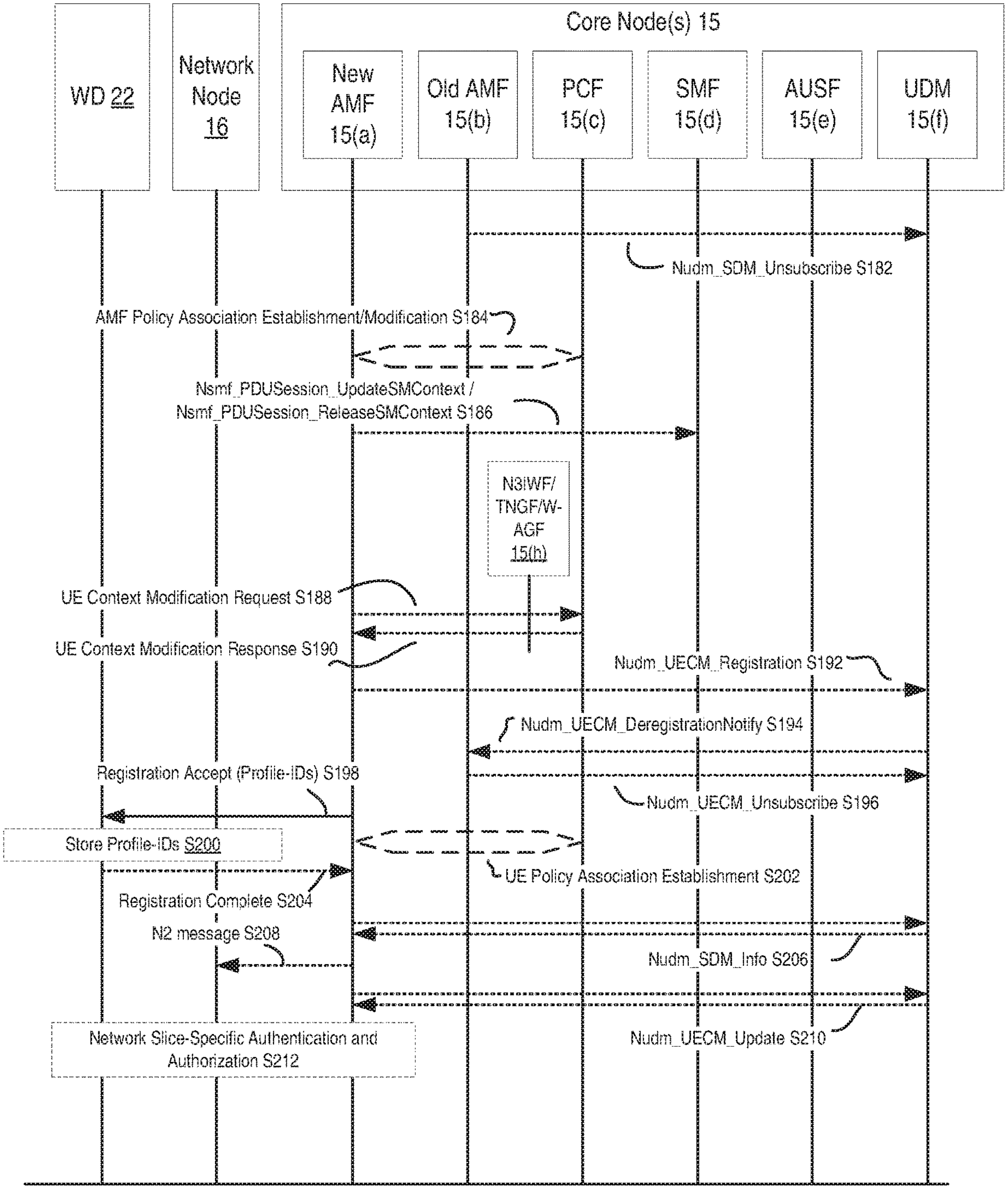

FIGS. 10A-10B are signaling diagrams of the call flow according to the typical registration for 3GPP Technical Report (TR) 23.502. Further, as used herein, one or more core nodes 15 may provide one or more of new AMF node 15(*a*), old AMF node 15(*b*), Policy Control Function (PCF)

node 15(*c*), Session Management Function (SMF) node 15(*d*), Authentication Server Function (AUSF) node 15(*e*), UDM node 15(*f*), and Equipment Identity Register (EIR) node 15(*g*), illustrated in FIGS. 10A-10B. For example, one core node 15 may provide PCF node 15(*c*), SMF node 15(*d*), and UDM node 15(*f*), while another core node 15 may provide new AMF node 15(*a*) and old AMF node 15(*b*). In another example, core node 15 can be any one of the nodes illustrated within core node 15 in FIGS. 10A-10B, i.e., a new AMF node 15(*a*), an old AMF node 15(*b*), a UDM node 15(*f*), etc.

In Step S144, the wireless device 22 sends a registration request to the network node 16. In Step S146, the network node 16 performs AMF selection. In Step S148, the network node 16 sends a registration request to the New AMF node 15(*a*). In Step S150, the New AMF node 15(*a*) sends a Namf Communication_UEContextTransfer message to the Old AMF node 15(*b*). In Step S152, the Old AMF Node 15(*b*) sends a Namf Communication_UEContextTransferResponse message to the New AMF node 15(*a*). In Step S154, the New AMF node 15(*a*) transmits an Identity Request to the wireless device 22. In Step S156, the wireless device 22 sends an identity response to the New AMF node 15(*a*). In Step S158, the New AMF node 15(*a*) performs AUSF selection. In Step S160, the network performs authentication and security procedures. In Step S162, the New AMF node 15(*a*) sends a Namf_Communication_RegistrationStatusUpdate message to the EIR node 15(*g*). In Step S164, the wireless device 22 and New AMF node 15(*a*) exchange identity request/response message(s). In Step S166, the New AMF node 15(*a*) and the PCF node 15(*c*) exchange N5g-eir_EquipmentIdentityCheck_Get message(s). In Step S168, the New AMF node 15(*a*) performs UDM Selection. In Step S170, the New AMF node 15(*a*) and the UDM node 15(*f*) exchange Nudm_UECM_Registration message(s).

In Step 172, the New AMF node 15(*a*) and the UDM node 15(*f*) exchange Nudm_SDM_Get message(s). In Step S172, the UDM node 15(*f*) is configured with additional PIDs and associated data, e.g., via an Information element (IE), as an additional element in the Access and Mobility subscription related data. Each PID includes the subscribed S-NSSAI for that PID. One PID is considered default for the subscription and will be initially in effect. This is sent to the New AMF node 15(*a*) during the retrieval.

In Step 174, the New AMF node 15(*a*) stores ProfileIDs and S-NSSAIs for each PID. The New AMF node 15(*a*) then interacts with NSSF to fetch the Allowed S-NNSAI for all PIDs. They are stored and bounded to the PID. The New AMF node 15(*a*) may only return to wireless device 22 the Allowed S-NSSAI for the default PID at initial registration.

In Step S176, the New AMF node 15(*a*) sends a Nudm_SDM_Subscribe 176 message to the UDM node 15(*f*). In Step S178, the UDM node 15(*f*) sends a Nudm_UECM_DeregistrationNotify message to the PCF node 15(*c*). In Step S180, the New AMF node 15(*a*) performs PCF Selection. In Step S182, the Old AMF node 15(*b*) sends a Nudm_SDM_Unsubscribe message to the UDM node 15(*f*). In Step S184, the New AMF node 15(*a*), Old AMF node 15(*b*), and PCF node 15(*c*) perform AMF Policy Association Establishment/Modification. In Step S186, the New AMF node 15(*a*) transmits a Nsfm_PDUSession_UpdateSMContext/Nsfm_PDUSession_ReleaseSMContext message to the SMF node 15(*d*). In Step S188, the New AMF node 15(*a*) sends a UE Context Modification Request to the Non-3GPPP Inter-Working Function (N3IWF), Trusted Non-3GPP Gateway Function (TNGF), and/or Wireline Access Gateway Function (W-AGF) node 15(*h*), which may be part of one or more of core node(s) 15. In Step 190, the N3IWF/TNGF/W-AGF node 15(*h*) sends a UE Context Modification Response to the New AMF node 15(*a*). In Step S192, the New AMF node 15(*a*) sends a Nudm_UECM_Registration message to the UDM node 15(*f*). In Step S194, the UDM node 15(*f*) sends a Nudm_UECM_DeregistrationNotify message to the Old AMF node 15(*b*). In Step S196, the Old AMF node 15(*b*) sends a Nudm_UECM_Unsubscribe message to the UDM node 15(*f*).

In Step S198, the New AMF node 15(*a*) sends a Registration Accept (ProfileIDs) message to the wireless device 22, and/or the PIDS are returned to the wireless device 22. In some embodiments, the Allowed S-NSSAI may include only those S-NSSAI(s) which is/are associated with the default PID, since this is an initial Registration.

In Step S200, the wireless device 22 stores the PIDs. In Step S202, the New AMF node 15(*a*), Old AMF node 15(*b*), and/or PCF node 15(*c*) perform UE Policy Association Establishment. In Step S204, the wireless device 22 sends a Registration Complete message to the New AMF node 15(*a*). In Step S206, the New AMF node 15(*a*) and UDM node 15(*f*) exchange Nudm_SDM_Info. In Step S208, the New AMF node 15(*a*) sends an N2 Message to the network node 16. In Step S210, the New AMF node 15(*a*) and the UDM node 15(*f*) exchange Nudm_UECM_Update messages. In Step S212, the wireless device 22, network node 16, and/or New AMF node 15(*a*) perform Network Slice-Specific Authentication and Authorization procedures.

In some embodiments, the UDM node 15(*f*) may be pre-configured with PIDs and/or associated S-NSSAI(s).

PIDS may have a user friendly name and an ID that is used for protocol/profile purposes. The currently applicable PID may also be displayed to the end user.

Switching Profiles

Figure 11:
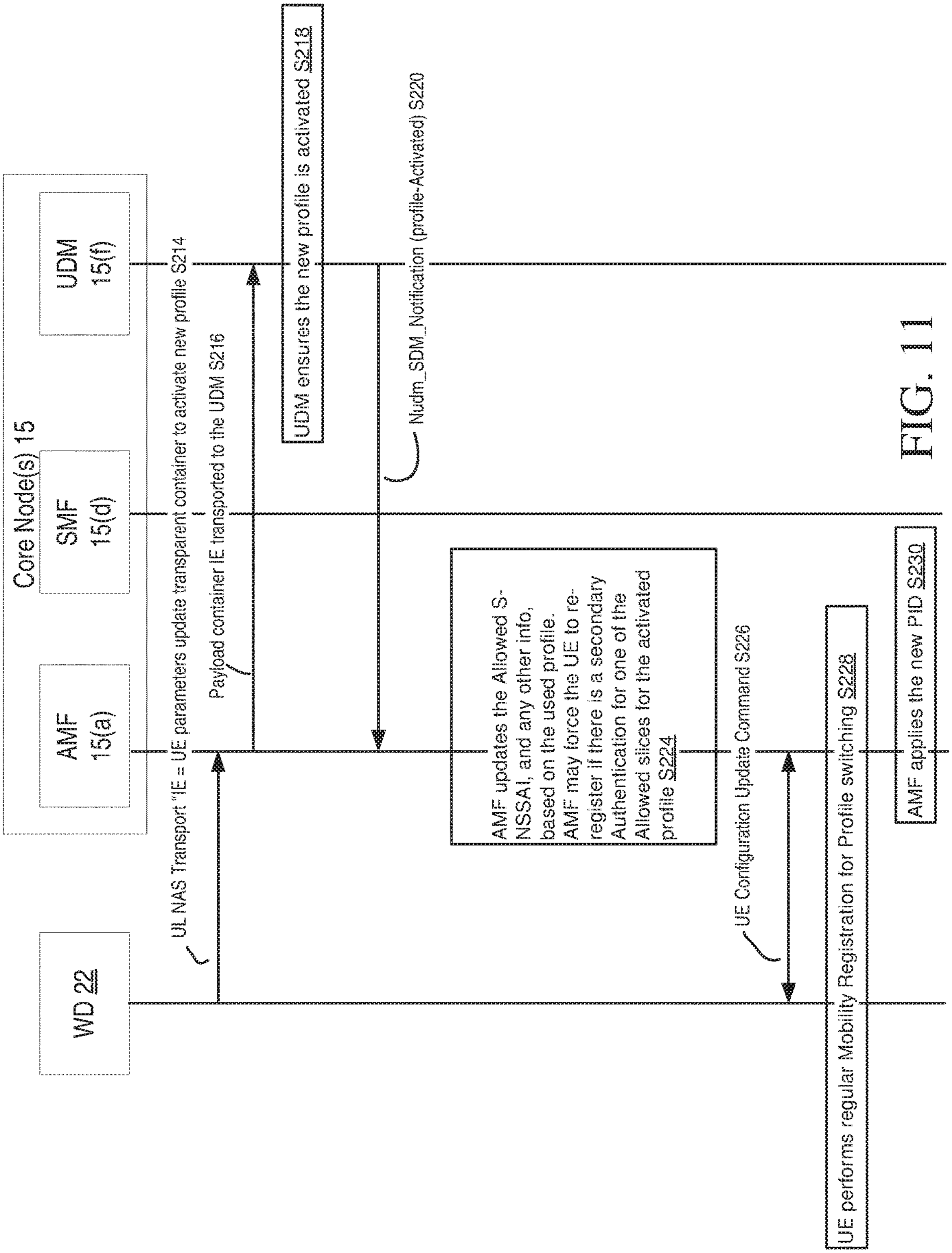
FIG. 11 is a signaling diagram for switching profiles according to one or more embodiments of the present disclosure.

FIG. 11 is a signalling diagram of a call flow of how a user can initiate a profile switch to a different profile.

The steps in the call flow are described below:

In Step S214, wireless device 22 initiates a UL NAS transport message, sent to the AMF, to inform the UDM node 15(*f*) that the wireless device 22 wants to initiate a profile switch. The existing IE=wireless device parameters update transparent container to activate new profile is extended with a new capability for profile switching and includes the target PID that wireless device 22 wants to use. This is included in the Payload container IE sent to the UDM node 15(*f*).

In Step S216, the UDM node 15(*f*) receives the instruction from the AMF node 15(*a*).

In Step S218, the UDM node 15(*f*) validates the needed information and performs the profile switch.

In Step S220, the UDM node 15(*f*) informs the AMF node 15(*a*) about the PID that is being activated in an Nudm-SDM_Notification (Nudm Subscriber Data Management) message that is extended to include this information.

In Step S224, the AMF node 15(*a*) updates the Allowed information, e.g., S-NSSAI, and any other info, based on the used profile. The AMF node 15(*a*) may request that the wireless device 22 re-register if there is a secondary Authentication for one of the Allowed slices for the activated profile. The AMF node 15(*a*) sets up its internal state to associate an upcoming mobility registration with the target PID. The AMF node 15(*a*) informs the wireless device 22 and may request that it re-registers so the new PID takes effect. This command is extended to support the profile switching In Step S226, the AMF node 15(*a*) exchanges configuration update(s) with the wireless device 22.

In step S228, wireless device 22 performs 5GC mobility registration to receive the new Allowed S-NSSAIs associated with the new PID. AMF node 15(*a*) knows that this mobility registration is associated with the target PID based at least on Step S224. The mobility registration itself is the same as an existing mobility registration except that there is a new trigger which is a profile switch.

In Step S230, the AMF node 15(*a*) applies the new PID.

While not shown in FIG. 11, in one or more embodiments, the AMF node 15(*a*) may, based on policies, tear down all PDU sessions associated with S-NSSAIs that belong to an old PID and not allowed with the new PID.

Extensions to Support Shared Device Between Multiple Users

Wireless device 22 can be shared as well by different users and can also support multiple passwords for different users sharing the same wireless device(s) 22 so that the password can be trigger for a profile switch, for example. There may be other user based triggers to initiate or cause the profile switch that are in accordance with the teachings described herein.

Therefore, one or more embodiments described herein relate to a PID concept, profile identifier. The UDM node 15 defines multiple profiles for in a wireless device 22 subscription where each profile includes PID, corresponding NSSAI information, and other subscription information. All PIDs and corresponding NSSAIs are provided to AMF during first registration, and AMF provides the information to wireless device 22 as well. However, AMF may only indicate allowed NSSAI to wireless device 22 that is related to the default PID.

In case wireless device 22 wants to switch to another PID/NSSAI received in the previous registration, wireless device 22 sends the target PID to the network (i.e., core network 15 via network node 16) and the network applies the new profile and corresponding NSSAI.

Wireless device 22 sends the wanted/target PID to UDM node 15 by extending the current parameter "WD parameters update transparent container" and the UDM node 15 indicates the wanted PID to AMF. The AMF switches to the new profile and updates wireless device 22 with new allowed NSSAI associated with the new PID, via the UCU procedure. An indication is provided to the AMF to remove the PDU sessions related to the previous PID/NSSAI. For certain cases, the AMF may still need to request wireless device 22 to perform normal (initial or mobility) Registration Request.

In one or more embodiments, other alternatives for wireless device 22 to indicate the wanted PID to AMF with limited impact on NAS message may be used where these alternatives may avoid a round trip via UDM node 15 or may be make round trip to UDM node 15 optional.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

SOME EXAMPLES

Example A1. An Access and Mobility Management Function, AMF, entity configured to communicate with a wireless device 22 and Unified Data Management, UDM, entity, the AMF configured to, and/or comprising processing circuitry configured to:

receive a message indicating the wireless device 22 is initiating a switch to a first profile associated with a target profile identifier, PID;

receive an indication that the first profile associated with the target PID has been activated by the UDM; and update allowed single-network slice selection assistance information, S-NSSAI, associated with the wireless device 22 to allow the target PID to be applied for the first profile.

Example A2. The AMF entity 15 of Example A1, wherein the processing circuitry is further configured to store a plurality of profiles and a plurality of S-NSSAIs that are usable by the wireless device 22 for profile switching, the plurality of profiles including the first profile.

Example A3. The AMF entity 15 of Example A1, wherein the processing circuitry is further configured to cause the wireless device 22 to perform mobility registration before the target PID is applied for the first profile.

Example A4. The AMF entity 15 of Example A1, wherein the message indicating the wireless device 22 is initiating the switch to the first profile associated with the target PID is an uplink NAS transport message including the target PID.

Example B1. A method implemented in an Access and Mobility Management Function, AMF, entity configured to communicate with a wireless device 22 and Unified Data Management, UDM, entity, the method comprising:

receiving a message indicating the wireless device 22 is initiating a switch to a first profile associated with a target profile identifier, PID;

receiving an indication that the first profile associated with the target PID has been activated by the UDM; and updating allowed single-network slice selection assistance information, S-NSSAI, associated with the wireless device 22 to allow the target PID to be applied for the first profile Example B2. The method of Example B1, further comprising storing a plurality of profiles and a plurality of S-NSSAIs that are usable by the wireless device 22 for profile switching, the plurality of profiles including the first profile.

Example B3. The method of Example B1, further comprising causing the wireless device 22 to perform mobility registration before the target PID is applied for the first profile.

Example B4. The method of Example B1, wherein the message indicating the wireless device 22 is initiating the switch to the first profile associated with the target PID is an uplink non-access-stratum, NAS, transport message including the target PID.

Example C1. A Unified Data Management, UDM, entity, that is configured to communicate with an Access and Mobility Management Function, AMF, entity, and a wireless device 22, the UDM entity 15 configured to, and/or comprising processing circuitry configured to:

receive an indication that the wireless device 22 is initiating a switch to a first profile associated with a target profile identifier, PID;

switch the wireless device 22 to the first profile at least in part by activating the first profile associated with the target PID;

indicate, to the AMF, that the first profile has been activated, the indication that the first profile has been activated being configured to allow the AMF to update its allowed single-network slice selection assistance information, S-NSSAI, associated with the wireless device 22 to allow the target PID to be applied for the first profile.

Example C2. The UDM of Example C1, wherein the UDM is configured with a plurality of PIDs where each PID is associated with respective S-NSSAI, the plurality of PIDs including the target PID.

Example D1. A method implemented in a Unified Data Management, UDM, entity that is configured to communicate with an Access and Mobility Management Functions, AMF, entity and a wireless device 22, the method comprising:

receiving an indication that the wireless device 22 is initiating a switch to a first profile associated with a target profile identifier, PID;

switching the wireless device 22 to the first profile at least in part by activating the first profile associated with the target PID;

indicating, to the AMF, that the first profile has been activated, the indication that the first profile has been activated being configured to allow the AMF to update its allowed single-network slice selection assistance information, S-NSSAI, associated with the wireless device 22 to allow the target PID to be applied for the first profile.

Example D2. The method of Example D1, wherein the UDM is configured with a plurality of PIDs where each PID is associated with respective S-NSSAI, the plurality of PIDs including the target PID.

Example E1. A wireless device 22 that is configured to communicate with an Access and Mobility Management Function, AMF, entity, and a Unified Data Management, UDM, entity, the wireless device 22 configured to, and/or comprising processing circuitry configured to:

cause transmission of a message indicating the wireless device 22 is initiating a switch to a first profile associated with a target profile identifier, PID, the indication of the first profile associated with a target PID configured to initiate the UDM to activate the first profile; and one of cause transmission and receive transmission in accordance with the activated first profile associated with the target PID.

Example E2. The wireless device 22 of Example E1, wherein the processing circuitry is further configured to:

receive mobility registration signaling that is configured to cause the wireless device 22 to re-register with the AMF before using the first profile; and perform mobility registration with the AMF for profile switching.

Example F1. A method implemented in a wireless device 22 that is configured to communicate with an Access and Mobility Management Function, AMF, entity, and a Unified Data Management, UDM, entity, the method comprising:

causing transmission of a message indicating the wireless device 22 is initiating a switch to a first profile associated with a target profile identifier, PID, the indication of the first profile associated with a target PID configured to initiate the UDM to activate the first profile; and one of causing transmission and receiving transmission in accordance with the activated first profile associated with the target PID.

Example F2. The method of Example F1, further comprising:

receiving mobility registration signaling that is configured to cause the wireless device 22 to re-register with the AMF before using the first profile; and performing mobility registration with the AMF for profile switching.

What is claimed:

1. A wireless device configured to communicate with an Access and Mobility Management Function, AMF, node, and a Unified Data Management, UDM, node, the wireless device comprising:

processing circuitry configured to:

determine to initiate a switch from a first profile associated with a first profile identifier, PID, to a target profile associated with a target PID;

cause transmission of a switch request message indicating the switch, the switch request message being configured to initiate the UDM node to activate the target profile;

at least one of cause transmission of and receive signaling in accordance with the activated target profile associated with the target PID;

receive a configuration update enabling the wireless device to use a target single-network slice selection assistance information, S-NSSAI, for signaling, an allowed S-NSSAI being based on a determined associated default PID;

transmit a registration request message to the AMF; and receive a registration accept message from the AMF, the registration accept message indicating the default PID and the allowed S-NSSAI.

2. The wireless device of claim 1, wherein the processing circuitry is further configured to:

receive a mobility registration message; and perform mobility registration based on the mobility registration message, the mobility registration being configured to re-register with the AMF node before using the target profile.

3. The wireless device of claim 1, wherein the processing circuitry is further configured to:

store a mapping of users of the wireless device to PIDs; and receive a login credential associated with a user of the wireless device, the determining of the switch from the first profile to the target profile being based on the user being mapped to the target PID.

4. The wireless device of claim 1, wherein the processing circuitry is further configured to:

cause transmission of a registration request message to the AMF node;

in response to the transmission of the registration request message, receive a registration accept message;

determine, based on the registration accept message, the first PID and an allowed first single-network slice selection assistance information, S-NSSAI, associated with the first PID; and at least one of cause transmission of and receive signaling in accordance with the allowed S-NSSAI.

5. The wireless device of claim 4, wherein the determining of the first PID is based on the first PID being a default PID.

6. The wireless device of claim 4, wherein the processing circuitry is further configured to:

determine, based on the registration accept message, a plurality of supported PIDs, the plurality of supported PIDs including the first PID and the target PID, the target PID being associated with a target S-NSSAI; and store the target PID and the target S-NSSAI.

7. The wireless device of claim 6, wherein the determining of the switch from the first profile to the target profile is further based on at least one of:

a financial cost associated with the target S-NSSAI;

a network performance parameter associated with the target S-NSSAI;

a time of day associated with the switch; and a user setting configured by a user of the wireless device, the user setting being at least one of: a work setting, a personal setting, and a streaming setting.

8. A method implemented in an Access and Mobility Management Function, AMF, node configured to communicate with a wireless device and a Unified Data Management, UDM, node, the method comprising:

receiving a switch request message indicating the wireless device is initiating a switch from a first profile associated with a first profile identifier, PID, to a target profile associated with a target PID;

receiving an activation message indicating that the target profile associated with the target PID has been activated by the UDM node;

determining a target single-network slice selection assistance information, S-NSSAI, associated with the wireless device based on the target profile;

causing transmission of a configuration update to the wireless device enabling the wireless device to use the target S-NSSAI for signaling;

receiving an indication indicating a plurality of PIDs and associated S-NSSAIs;

determining a default PID of the plurality of PIDs based on the indication;

determining an allowed S-NSSAI associated with the default PID;

receiving a registration request message from the wireless device; and in response to the receiving of the registration request message, causing transmission of a registration accept message to the wireless device, the registration accept message indicating the default PID and the allowed S-NSSAI.

9. The method of claim 8, further comprising:

causing the wireless device to perform mobility registration before the target PID is applied for the target profile.

10. The method of claim 8, wherein the registration accept message further indicates the plurality of PIDs and associated S-NSSAIs.

11. The method of claim 8, wherein the switch request message is an uplink non-access-stratum (NAS) transport message including the target PID.

12. The method of claim 8, wherein the first PID is associated with a first S-NSSAI, the first S-NSSAI being associated with a packet data unit, PDU, session, the method further comprising:

in response to the receiving of the switch request message, deactivating the PDU session based on the first S-NSSAI not being associated with the target PID.

13. The method of claim 8, wherein the receiving of the switch request message is based on a login credential associated with the target PID being received by the wireless device.

14. The method of claim 8, wherein the receiving of the switch request message is based on at least one of:

a financial cost associated with the target S-NSSAI;

a network performance parameter associated with the target S-NSSAI;

a time of day associated with the switch; and a user setting configured by a user of the wireless device, the user setting being at least one of: a work setting, a personal setting, and a streaming setting.

15. A Unified Data Management, UDM, node, configured to communicate with an Access and Mobility Management Function, AMF, node, and a wireless device, the UDM node comprising:

processing circuitry configured to:

receive a switch request message indicating that the wireless device is initiating a switch from a first profile associated with a first profile identifier, PID, to a target profile associated with a target PID;

switch the wireless device to the target profile, the switching including activating the target profile associated with the target PID;

cause transmission, to the AMF node, of an activation message, the activation message:

indicating that the target profile has been activated, and being configured to cause the AMF node to determine a target single-network slice selection assistance information, S-NSSAI, associated with the wireless device to allow the target PID to be applied for the target profile;

store a plurality of PIDs, each of the plurality of PIDs being associated with a respective S-NSSAI, the plurality of PIDs including a default PID, the default PID being associated with an allowed S-NSSAI;

receive an initial registration request message; and in response to the receiving of the initial registration request message, cause transmission of an indication to the AMF node indicating the plurality of PIDs and respective S-NSSAIs, the default PID, and the allowed S-NSSAI, for configuring the wireless device to utilize the allowed S-NSSAI for the signaling.

16. The UDM node of claim 15, wherein the receiving of the switch request message is based on a login credential associated with the target PID being received by the wireless device.

17. The UDM node of claim 15, wherein the receiving of the switch request message is based on at least one of:

a financial cost associated with the target S-NSSAI;

a network performance parameter associated with the target S-NSSAI;

a time of day associated with the switch; and a user setting configured by a user of the wireless device, the user setting being at least one of: a work setting, a personal setting, and a streaming setting.

18. The UDM node of claim 15, wherein the switch request message is an uplink non-access-stratum (NAS) transport message including the target PID.

* * * * *